ISO 8312175B2

United States Patent
Patale et al.

(10) Patent No.: US 8,312,175 B2
(45) Date of Patent: Nov. 13, 2012

(54) VIRTUAL MACHINE ACCESS TO STORAGE VIA A MULTI-QUEUE IO STORAGE ADAPTER WITH OPTIMIZED CACHE AFFINITY AND PCPU LOAD BALANCING

(75) Inventors: Vibhor Patale, Bangalore (IN); Rupesh Bajaj, Madhya Pradesh (IN); Edward Goggin, Concord, MA (US); Hariharan Subramanian, Wakefield, MA (US)

(73) Assignee: VMware, Inc., Palo Alto, CA (US)

( * ) Notice: Subject to any disclaimer, the term of this patent is extended or adjusted under 35 U.S.C. 154(b) by 478 days.

(21) Appl. No.: 12/691,550

(22) Filed: Jan. 21, 2010

(65) Prior Publication Data

US 2011/0179416 A1 Jul. 21, 2011

(51) Int. Cl.
*G06F 3/00* (2006.01)
*G06F 9/46* (2006.01)
*G06F 13/00* (2006.01)
*G06F 15/173* (2006.01)

(52) U.S. Cl. ............ 710/1; 718/104; 718/105; 711/170; 711/173; 709/223; 709/224; 709/225; 709/226

(58) Field of Classification Search .................. None
See application file for complete search history.

(56) References Cited

U.S. PATENT DOCUMENTS

| 7,404,190 B2 | 7/2008 | Krause et al. | |
|---|---|---|---|
| 7,568,056 B2 | 7/2009 | Danilak | |
| 7,590,805 B2 | 9/2009 | Sistla | |
| 7,853,752 B1* | 12/2010 | Agarwal et al. | 711/120 |
| 2005/0005019 A1* | 1/2005 | Harville et al. | 709/231 |
| 2006/0031650 A1* | 2/2006 | Kanai et al. | 711/162 |
| 2007/0271401 A1* | 11/2007 | Louzoun et al. | 710/264 |
| 2008/0098233 A1* | 4/2008 | Dewkett et al. | 713/189 |
| 2008/0155571 A1 | 6/2008 | Kenan et al. | |
| 2008/0215787 A1 | 9/2008 | Mizrachi et al. | |
| 2009/0007150 A1* | 1/2009 | Li et al. | 719/321 |
| 2009/0037658 A1 | 2/2009 | Sistla | |
| 2009/0210075 A1* | 8/2009 | Moriwaki | 700/28 |
| 2009/0222558 A1 | 9/2009 | Xu | |
| 2010/0186010 A1* | 7/2010 | Chalemin et al. | 718/1 |

OTHER PUBLICATIONS

Exploring the Cache Design Space for Large Scale CMPs, ACM SIGARCH Computer Architecture News by Lisa Hsu†, Ravi Iyer, Srihari Makineni, Steve Reinhardt, Donald Newell, 2005.
QLogic's Open Standards Based Host and Fabric Virtualization Solution 8Gb FC Adapters Offer NPIV Based Quality of Service (QoS), White Paper by QLogic Corporation, dated 2009.

* cited by examiner

*Primary Examiner* — Emerson Puente
*Assistant Examiner* — Adam Lee

(57) ABSTRACT

A method is provided for use in a system that includes a host machine that includes multiple physical CPUs (PCPUs) and at least two cache nodes that are shared by different sets of the PCPUs, comprising: creating in a memory device multiple sets of lanes each lane set associated with a respective PCPU set; tracking levels of processing activity of the PCPUs of each PCPU set; using an MSIX vector value to associate lanes with PCPUs; receiving a IO request from any given PCPU from among the multiple PCPUs; and assigning the IO request to a respective lane based at least in part upon the PCPU set associated with the lane and PCPU processing activity levels.

16 Claims, 7 Drawing Sheets

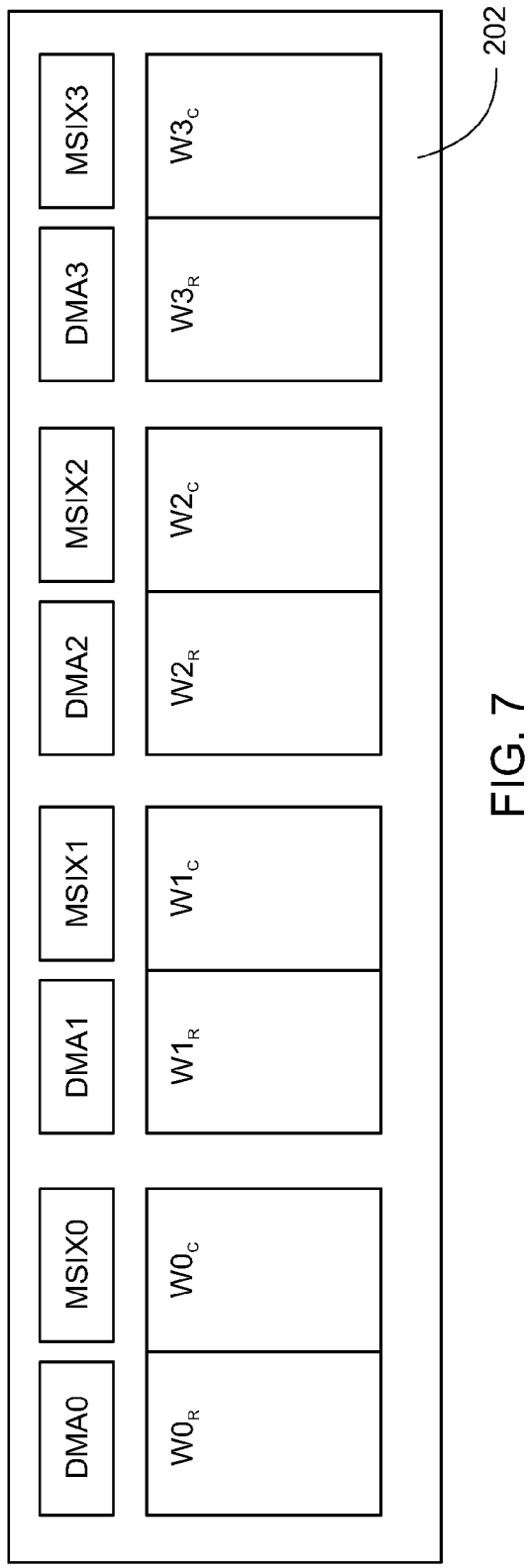

US 8,312,175 B2

VIRTUAL MACHINE ACCESS TO STORAGE VIA A MULTI-QUEUE IO STORAGE ADAPTER WITH OPTIMIZED CACHE AFFINITY AND PCPU LOAD BALANCING

This application is related to U.S. application Ser. No. 12/689,152 titled "Virtual Target Addressing During Direct Data Via VF of IO Storage Adapter", U.S. application Ser. No. 12/689,162 titled "Configuring VM and IO Storage Adapter VF for Virtual Target Addressing During Direct Data Access", and U.S. application Ser. No. 12/687,999 titled "Guest/Hypervisor Interrupt Coalescing for Storage Adapter Virtual Function in Guest Passthrough Mode."

BACKGROUND

A virtual machine involves—a "virtualization"—in which an actual physical machine is configured to implement the behavior of the virtual machine. Multiple virtual machines (VMs) can be installed on a physical host machine, referred to as a 'host', which includes physical system hardware that typically includes one or more physical processors (PCPUs) and physical memory and various other physical devices, such as an IO storage adapter to perform protocol conversions required to access a remote storage such as over a storage access network (SAN). The virtual machine includes virtual system hardware that ordinarily includes one or more virtual CPUs (VCPUs), virtual memory, at least one virtual disk, and one or more virtual devices all of which may be implemented in software using known techniques to emulate the corresponding physical components. A VM typically will have both virtual system hardware and guest system software including virtual drivers used for various virtual devices. One or more layers or co-resident software components comprising a virtualization intermediary, e.g. a virtual machine monitor (VMM), hypervisor or some combination thereof acts to instantiate and provision VMs and to allocate host machine resources dynamically and transparently among the VMs so that their respective guest operating systems can run concurrently on a single physical machine.

Multi-core multi-processor systems are becoming increasingly common in commercial server systems because of their performance, scalability and modular design. These systems often include multiple cache nodes at various levels of a cache hierarchy. Caches are commonly used to temporarily store values that might be repeatedly accessed by a processor, in order to speed up processing by avoiding the longer step of loading the values from memory. Multi-level cache hierarchies can be provided where there are several levels of interconnected caches. For example, in a processor system having two cache levels, a level 2 (L2) cache may act as an intermediary between memory and one or more level 1 (L1) caches. A multi-processor system may include a last-level cache (LLC), which is shared by multiple core processors of the system. The LLC ordinarily is the closest cache to system memory and typically is the largest member of a cache hierarchy.

A host machine may employ an IO storage adapter to act as an interface to transfer data between the machine's IO bus and SCSI storage, for example. The IO storage adapter may include physical resources such as one or more processors, memory and other computing devices so as to perform various computing and communication functions. The IO storage adapter may implement a port based SCSI transport protocol, such as Fiber Channel, iSCSI or SAS to exchange data over a network. In accordance with the iSCSI transport protocol, for example, a SCSI initiator is responsible for packaging a SCSI command descriptor block (CDB) perhaps with the aid of a machine's operating system and sending the CDB over an IP network. A SCSI target receives the CDB and sends it to a SCSI logical unit managed by the SCSI target. The SCSI target sends back a response to the CDB that include a completion status that indicates the final disposition of the command.

FIG. 1 is an illustrative drawing showing a virtualization intermediary 110 that manages access to physical storage located within a storage area network (SAN) 106 through an IO storage adapter 102. Processing of IO requests and of IO completions is allocated among multiple physical processors PCPUs (not shown) of a multi-processor host machine 105. Unfortunately, the transfer of data over an IO storage adapter 102 between a multi-processor host machine 105 and storage 106 can result in non-uniform access to cache nodes (not shown) shared among the multiple PCPUs, which in turn can degrade IO performance. In the illustrated example, a VM 104 issues an IO access request to a virtual disk, blocks of which are carved out from logical device 108, that is disposed within the virtualization intermediary 110 and logically speaking, behind the adapter 102. Persons skilled in the art will appreciate that logical devices provisioned to the host, are the physical objects managed by the virtualization intermediary 110. The virtualization intermediary 110 in turn uses these logical disks to create the virtual disks provided to VMs. A virtualization intermediary 110 includes a request queue 112 to receive IO requests directed from the VM 104 to a logical unit within the storage 106 and that includes a completion queue 114 to receive responses directed from the storage 106 to the VM 104. The request queue 112 and the completion queue 114 are disposed in host memory 107 managed by the virtualization intermediary 110. The virtualization intermediary 110 includes a VMK (virtual machine kernel) hardware adapter (HA) driver 116 to communicate IO commands with the adapter 102. The adapter 102 includes DMA support 118 to exchange actual data directly to host system memory 107.

In operation with a host machine having a PCI bus, for example, the virtualization intermediary 110 may pseudo-randomly from among multiple PCPUs (PCPU0-PCPU3) 103 of the host 105 to issue a stream of IO request commands within the request queue 112. The storage 106, in turn, sends a response that includes completion information to the adapter 102. The adapter 102 notifies the virtualization intermediary 110 of receipt of such completion response by issuing an interrupt on a vector assigned to a PCI function containing the completion queue 114. The interrupt vector assigned to the IO storage adapter 102 is managed by the virtualization intermediary 110 so as to cause it deliver each IO completion interrupt to whichever PCPU is identified by the virtualization intermediary 110 to be least loaded across the entire host machine 105. Since the distribution of load on the PCPUs and interrupt delivery is pseudo-random, this approach often results in IO completion processing being allocated in a pseudo-random manner to the available PCPUs.

Referring to the request queue 112, the first request command $C_{R1}$ in the illustrated series of commands is issued on PCPU P1. The second request command $C_{R2}$ in the series is issued on PCPU P0. The third request command $C_{R3}$ in the series is issued on PCPU P2. The fourth request command $C_{R4}$ in the series is issued on PCPU P3. The fifth request command $C_{R5}$ in the series is issued on PCPU P0.

Referring now to the completion queue 114, the first completion response $C_{C1}$, which corresponds to the first request command $C_{R1}$, is issued on PCPU P3. The second completion response $C_{C2}$, which corresponds to the second request command $C_{R2}$ is issued on PCPU P2. The third completion command $C_{C3}$, which corresponds to the third request command $C_{R3}$ is issued on PCPU P0. The fourth completion command $C_{C4}$, which corresponds to the fourth request command $C_R$ is issued on PCPU P0. The reply to the fifth command $C_{C5}$, which corresponds to the fifth request command $C_{R5}$ is issued on PCPU P1. Note that responses need not be received in the same order in which the requests were made.

A request command and a corresponding completion response may have a producer-consumer relationship and each may require access to the same given data structure. For example, in the course of PCPU P1 processing of the request command $C_{R1}$ in the request queue 112, information may be stored in a cache node (not shown) shared among the PCPUs 103 that may be needed for processing by PCPU P3 of corresponding completion command $C_{C1}$ in the completion queue 114. Since different processors process the request command $C_{R1}$ and the corresponding completion $C_{C1}$ and these different processors may not share a common cache node, there may be a need to for PCPU P3 to access main memory 107 to obtain the given data structure needed to process the completion command $C_{c1}$. This in turn could result in the need for more processor cycles to process the completion than if the needed information could be obtained directly from a shared cache node.

Thus, there has been a need for improvement in the processing of IO transmissions.

SUMMARY

In some embodiments, a method and system is provided to associate sets of physical CPUs that may be used by a virtual machine with sets of lane structures created in memory space of a virtualization intermediary. The lanes are used to queue IO requests and IO completions. PCPU activity levels are tracked for the PCPUs of each PCPU set. The least busy PCPUs are assigned to lanes for use in processing IO completions. The PCPU lane associations are changed periodically in response to changes in the activity levels of different PCPUs. For any given IO request, the least busy PCPU currently associated with a lane associated with the PCPU set of the PCPU that issued the given IO request is assigned to the IO request. Accordingly, IO requests are assigned to least busy PCPUs.

In another aspect of some embodiments, both the PCPU that issues an IO request and the PCPU that processes an IO completion are members of a PCPU set that share cache memory. Specifically, a request lane created in memory space of a virtualization intermediary is associated with a request work queue disposed in an IO storage adapter. A completion work queue disposed in the IO storage is associated with a completion queue created in the virtualization intermediary. The association of lanes with PCPU sets and the association of lanes with IO storage adapter work queues contributes to cache affinity among the PCPU used to issue an IO request and the PCPU used to process a corresponding IO completion.

In yet another aspect of some embodiments, work queues are created in an IO storage adapter that correspond to lanes created in the memory space of the virtualization intermediary. MSIX vectors are used to designate which PCPU is to process a given IO completion. Respective MSIX vectors are associated with respective work queues. Different MSIX vector values correspond to different PCPUs. MSIX vector values are assigned to MSIX vectors to associate the least busy PCPUs with work queues. Accordingly, an MSIX vector is used to associate the least busy PCPUs to process IO completions.

BRIEF DESCRIPTION OF THE DRAWINGS

FIG. 7 is an illustrative block diagram showing certain details of the IO storage adapter of FIG. 2.

FIG. 8 is an illustrative drawing representing a fourth data structure created within the multi-queue IO storage adapter of FIG. 2.

DESCRIPTION OF THE EMBODIMENTS

The following description is presented to enable any person skilled in the art to make and use a system and method to process IO accesses transmissions between a virtual machine and physical storage involving an IO storage adapter managed by a virtualization intermediary in accordance with some embodiments, and is provided in the context of particular applications and their requirements. Various modifications to the preferred embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that embodiments of the invention might be practiced without the use of these specific details. In other instances, well-known structures and processes are shown in block diagram form in order not to obscure the description of the embodiments with unnecessary detail. Thus, the present invention is not intended to be limited to the embodiments shown, but to be accorded the widest scope consistent with the principles and features described herein.

In this description, reference is sometimes made to a virtual machine, a hypervisor kernel, virtual machine monitors (VMMs), a virtualization intermediary 210 or some other virtualized component taking some action. Persons skilled in the art will appreciate that a hypervisor kernel, VMMs and a virtualization intermediary comprises one or more software layers that run on a host machine 205, which comprises hardware and software. In order to perform any given action, a virtual machine, virtualization intermediary or other virtualized component configures physical resources of the host machine 205 to perform the given action. For example, the virtualization intermediary 210 may configure one or more physical processors, according to machine readable program code stored in machine readable storage device, to re-assign PCPUs allocated to I/O management based upon PCPU activity levels.

Figure 1:
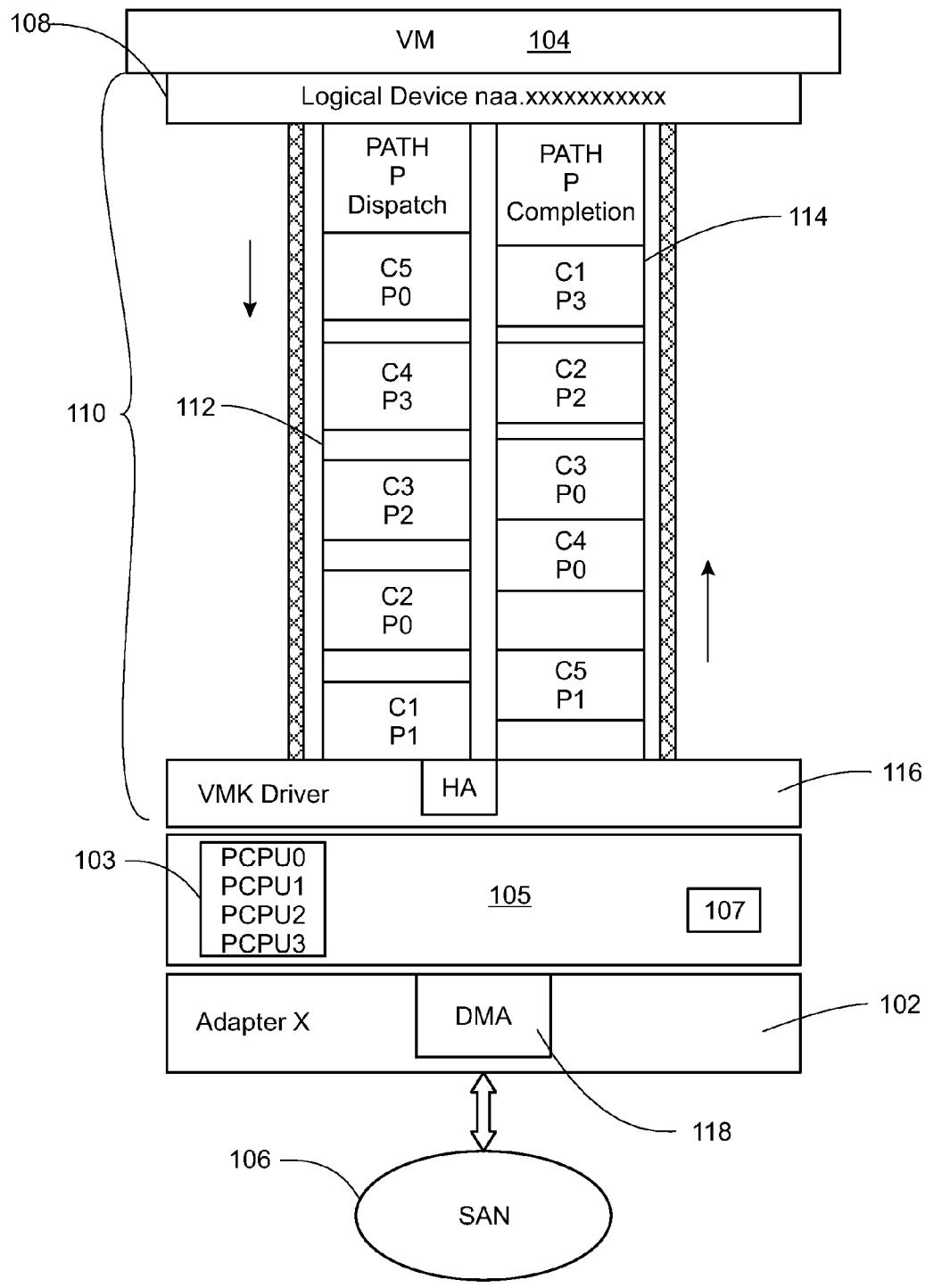
FIG. 1 is an illustrative drawing showing a virtualization intermediary that manages access to physical storage through an IO storage adapter.
Figure 2:
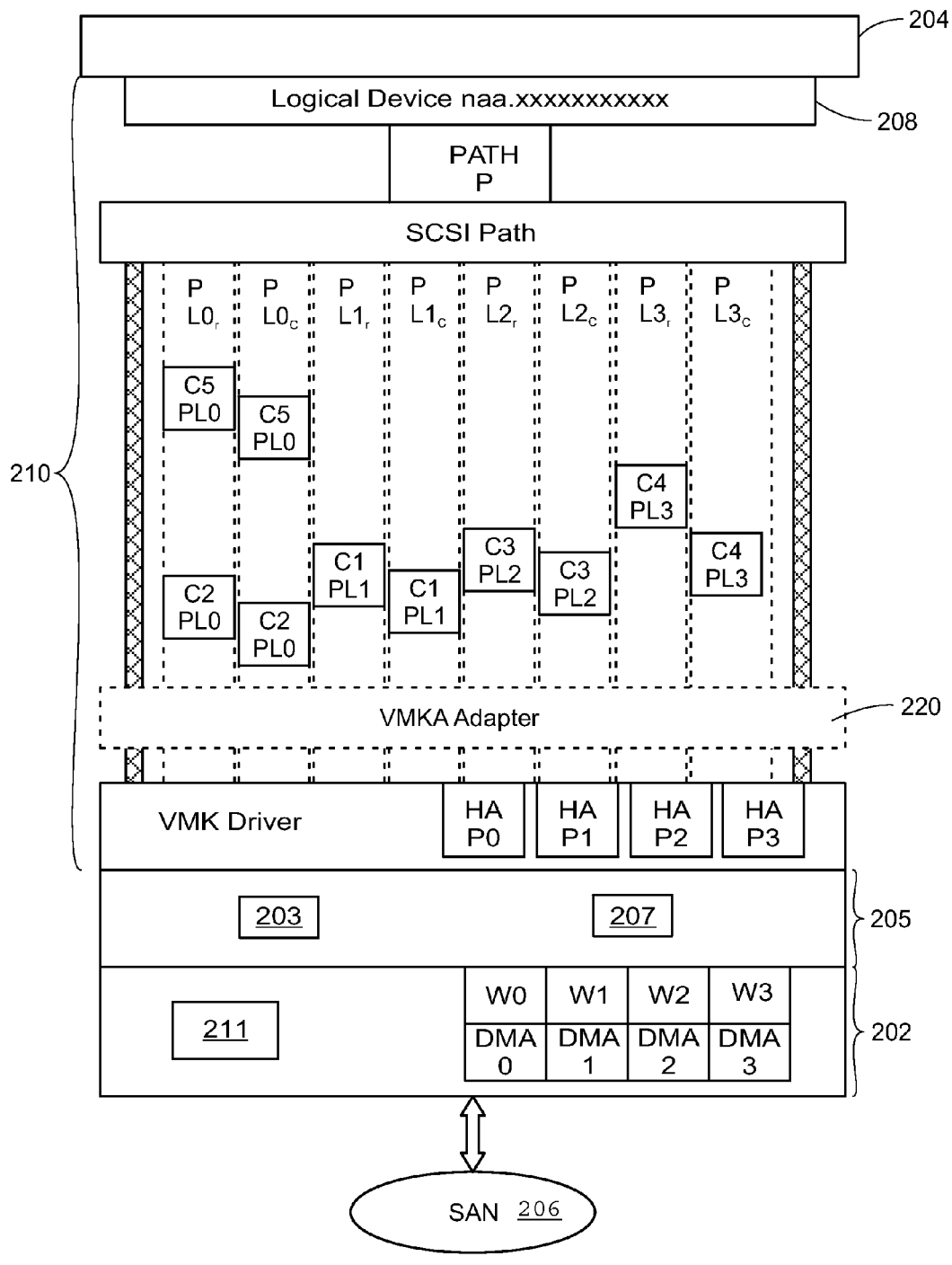
FIG. 2 is an illustrative drawing showing a virtualization intermediary that runs on a host machine and that manages access to physical storage through a multi-queue IO storage adapter.

FIG. 2 is an illustrative drawing showing a virtualization intermediary 210 that runs on a host machine 205 and that manages access to physical storage 206 through a multi-queue IO storage adapter 202. The virtualization intermediary instantiates a set of logical lanes L0-L3, which comprise respective set of request lanes $L0_R$-$L3_R$ and respective set of completion lanes $L0_C$-$L3_C$. The logical lanes comprise data structures that are created within in host memory 207 and that are managed by the virtualization intermediary 210. These data structures are created during initialization of the virtualization intermediary 210, when the multi-queue adapter 202 is registered with the virtualization intermediary. A registered VMK adapter object 220 within the virtualization intermediary keeps track of information regarding the logical lanes and PCPUs associated with the logical lanes as explained more fully below. The IO storage adapter 202 includes multiple work queues W0-W3, which comprise respective request work queues $W0_R$-$W3_R$ and respective completion work queues $W0_C$-$W3_C$. The work queues comprise data structures that are created and managed by adapter physical processing and memory resources 211, which may include processors, memory and other computing devices (not shown) so as to perform various computing and communication functions. The work queues are created during the initialization of multi-queue adapter. The virtualization intermediary 210 will start the initialization of adapter 202, and in case multiple queues are supported by the adapter, multiple work queues will be created and configured in the adapter. The adapter 202 also includes respective DMA support DMA0-DMA3 for respective work queues W0-W3 to exchange actual data directly to host system memory 107. The virtualization intermediary 210 includes the logical VMK adapter 220, which serves as a registration of the physical host adapter 202 with the virtualization intermediary 210. During registration of the adapter 202, a VMK device driver provides a set of entry points (function pointers) relative to the VMK adapter 220 that can be used by virtualization intermediary 210 to control and operate the adapter 202. The virtualization intermediary 210 includes respective hardware adapter (HA) HA0-HA3 drivers that use the entry points to communicate IO commands and IO completions with respective work queues W0-W3 of the IO storage adapter 202.

In operation, a virtual machine 204 issues an IO access request to a virtual disk, blocks for which are carved out from logical storage device 208. The virtualization intermediary 210 intercepts the request and manages processing of the request, which involves transfer of requests and request completions between logical lanes L0-L3 and corresponding work queues W0-W3. In some embodiments, the queued requests and completions are compliant with the Small Computer System Interconnect (SCSI) specification. Multiple requests and completions directed to the same SCSI path may be queued for processing at any given time within the logical lanes and within the work queues.

Specifically, the request lanes $L0_R$-$L3_R$ and the request work queues $W0_R$-$W3_R$ are used to queue multiple SCSI IO requests referred to as commands or CDBs. The completion lanes $L0_C$-$L3_C$ and the completion work queues $W0_C$-$W3_C$ are used to queue multiple SCSI responses, also referred to as completions. A SCSI command is an IO request describing a unit of work to be performed by a device server. A SCSI command descriptor block (CDB) comprises a data structure encoded in a memory device used to communicate commands from an application client to a device server. The SCSI command set assumes an underlying request-response protocol. The fundamental properties of the request-response protocol are defined in SCSI Architecture Model (SAM)-3. Action on SCSI commands is not deemed completed until a response, i.e. a 'completion' is received. The response includes a status that indicates the final disposition of the command. The SCSI command protocol is asynchronous. Multiple 10 commands can be issued concurrently i.e. a system can issue a new CDB before a prior command completes. See, SCSI Primary Commands-3 (SPC-3), Revision 23, Section 4.2, The request-response model, May 4, 2005, American National Standards for Information Systems—InterNational Committee for Information Technology Standards.

A CDB identifies a SCSI path in terms of a unique combination comprising a SCSI initiator, a SCSI target, and a SCSI logical unit. A SCSI initiator is a SCSI device that contains application clients that originate device service and task management requests to be processed by a SCSI target and that receives device service and task management responses from SCSI targets. The virtual machine 204 may include a component such as a virtual driver (not shown) that serves as a SCSI initiator. A SCSI initiator is responsible for packaging a SCSI CDB perhaps with the aid of a machine's operating system and sending the CDB to a virtual disk behind a virtual SCSI target. The virtualization intermediary 210 accepts the CDB issued to the virtual disk and converts it to the CDB to be issued to SCSI logical unit in a physical SCSI target. A SCSI target is a SCSI device containing logical units that receives device service and task management requests for processing from one or more SCSI initiators and that sends device service and task management responses to such SCSI initiators. A logical unit is an externally addressable entity within a SCSI target, such as disk, CD-ROM, tape drive, printer, scanner or any type of SCSI device, managed by a SCSI target that implements a SCSI device model and that contains a device server. A SCSI target may manage numerous logical units. The SCSI target sends back a response, referred to as a completion, to the CDB that include a status that indicates the final disposition of the command. Herein, the storage 206 includes the SCSI target and logical unit. The responses received from the physical SCSI target are converted by the VI to deliver the response to the CDB issued by VM 204 on the virtual disk.

Referring again to FIG. 2, CDB (IO) requests $C_{R5}$ and $C_{R2}$ are queued in request lane $L0_R$, and corresponding IO completions $C_{C5}$ and $C_{C2}$ are queued in completion lane $L0_C$. CDB request $C_{R1}$ is queued in request lane $L1_R$, and corresponding reply completions $C_{C1}$ is queued in completion lane $L1_C$. CDB request $C_{R3}$ is queued in request lane $L2_R$, and corresponding reply completion $C_{C3}$ is queued in completion lane $L2_C$. CDB request $C_{R4}$ is queued in request lane $L3_R$, and corresponding reply completion $C_{C4}$ is queued in completion lane $L3_C$. It will be appreciated of course, that IO requests and their corresponding IO completions are not queued contemporaneously since the IO completion is responsive to the IO request.

The host machine 205 includes a processing core 203 that includes multiple PCPUs and shared cache described below with reference to device, and also includes host memory 207. Each CDB IO request is processed by a PCPU, and each corresponding IO completion is processed by a PCPU. The virtualization intermediary 210 allocates physical resources of the host machine 205 across the one or more VMs that may be running on the host at any given time. Each VM includes a VCPU, and when a VM invokes an operation by its VCPU, the virtualization intermediary 210 allocates a PCPU to actually perform the function. Since there typically is a time delay between transmission of a CDB from an adapter 202 to the storage 206 and the sending of completion by storage 206 back to the adapter 202, different PCPUs often are involved in processing of a CDB request and its corresponding completion.

In this description, reference is sometimes made to the virtualization intermediary 210 taking some action. Persons skilled in the art will appreciate that the virtualization intermediary 210 comprises one or more software layers that run on the host machine 205. In order to perform any given action, the virtualization intermediary 210 employs physical resources of the host machine 205 to perform a given action. For example, the virtualization intermediary 210 may configure one or more PCPUs from the core 207 to manage access to storage 206.

Figure 3:
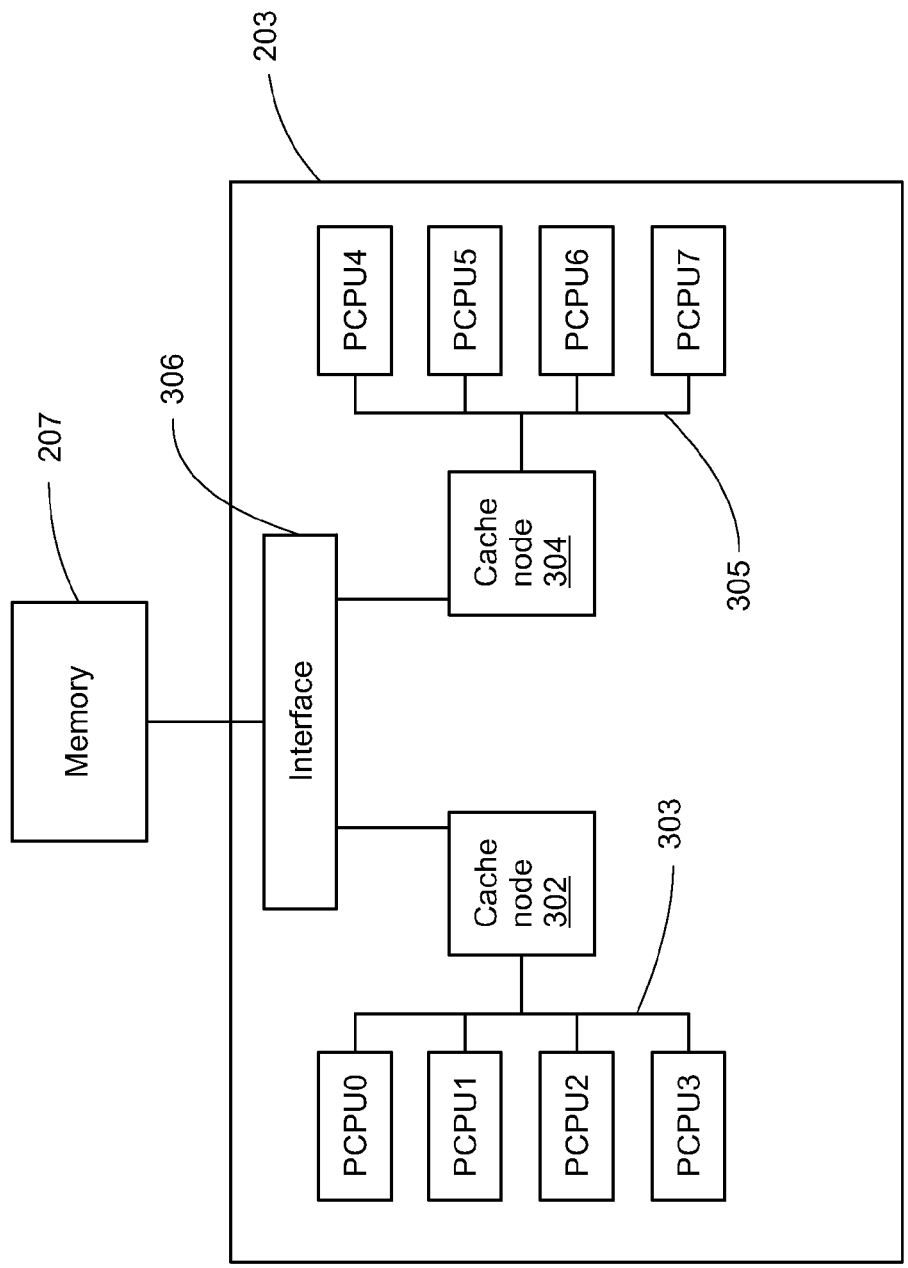
FIG. 3 is an illustrative block diagram showing details of a processing core that contains multiple PCPUs that share cache nodes within the host machine of FIG. 2.

FIG. 3 is an illustrative block diagram showing details of a processing core 203 that contains multiple PCPUs that share cache nodes within the host machine of FIG. 2. In the example embodiment, eight PCPUs share two cache nodes. PCPU0-PCPU3 share first cache node 302 via local bridge 303, and PCPU4-PCPU7 share second cache node 304 via local bridge 305. An interface 306 provides access to the local memory device 207 of the host machine 205, which may for example comprise disk storage. In some embodiments, the first and second cache nodes 302, 304 are constituents of a multi-level cache hierarchy (not shown) in which they are last level cache (LLC) nodes.

Figure 4:
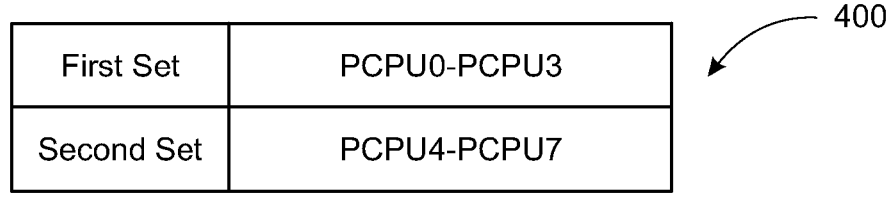
FIG. 4 is an illustrative drawing representing a first data structure created in host memory of the host machine of FIG. 2.

FIG. 4 is an illustrative drawing representing a first data structure 400 created in host memory 207 that groups the multiple PCPUs from the core 203 into sets according to cache node sharing. The first data structure 400 is created in the course of initialization of the virtualization intermediary 210. The first data structure 400 associates PCPU0-PCPU3 with a first PCPU set that corresponds to the first cache node 302. The first data structure 400 associates PCPU4-PCPU7 with a second PCPU set that corresponds to the second cache node 304.

In order to achieve more efficient IO processing, both a SCSI IO request (e.g., a CDB) and its corresponding SCSI IO completion are processed using PCPUs from the same set. In the course of processing a given IO request, data structures, program code or other information used in the processing of a given IO request is temporarily stored (i.e. cached) in a cache node associated with the PCPU that processed the IO request. By processing a corresponding IO completion using a PCPU from the same set as that of the PCPU that processed the original IO request, the cached data structure, program code or other information can be retrieved from the shared cache for use in processing the IO completion, thereby avoiding the need to retrieve it from host machine memory 207. Thus, instruction cycles can be avoided that otherwise would have been required to retrieve from the host memory 207 information that is used both in an IO request stage and in a corresponding IO completion stage.

Figure 5:
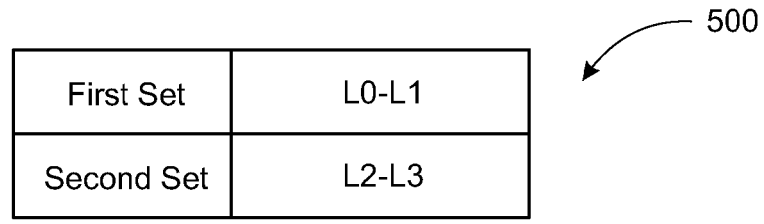
FIG. 5 is an illustrative drawing representing a second data structure created in host memory of the host machine of FIG. 2.

FIG. 5 is an illustrative drawing representing a second data structure 500 created in host memory 207 that associates the PCPU sets with logical lanes L0-L3. The second data structure 500 is created in the course of initialization of the virtualization intermediary 210. The second data structure associates the first PCPU set with logical lanes L0-L1 and associates the second PCPU set with logical lanes L2-L3.

Figure 6:
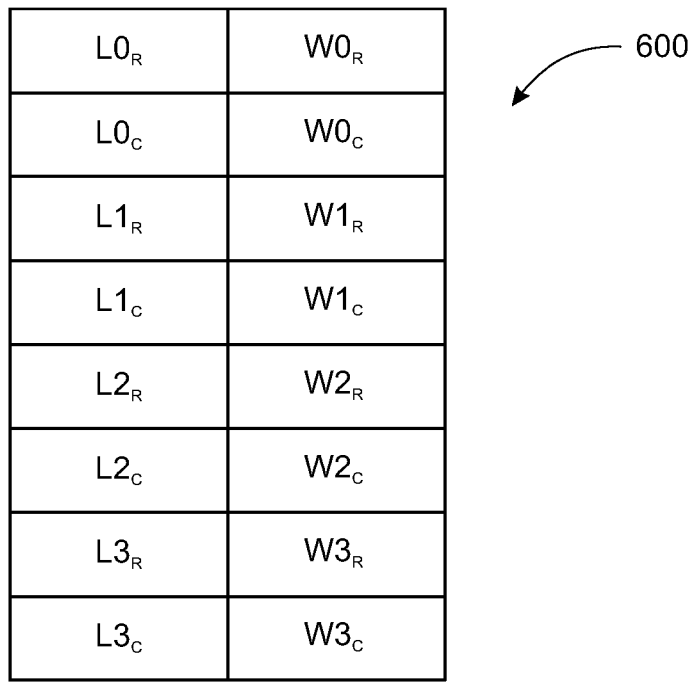
FIG. 6 is an illustrative drawing representing a third data structure created in host memory of the host machine of FIG. 2.

FIG. 6 is an illustrative drawing representing a third data structure 600 created in host memory 207 that associates logical lanes L0-L3 with work queues W0-W3. The third data structure 600 is created in the course of initialization of the virtualization intermediary 210. The third data structure associates request lane $L0_R$ to request work queue $W0_R$; associates request lane $L1_R$ to request work queue $W1_R$; associates request lane $L2_R$ to request work queue $W2_R$; and associates request lane $L3_R$ to request work queue $W3_R$. The third data structure also associates completion lane $L0_C$ to completion work queue $W0_C$; associates completion lane $L1_C$ to completion work queue $W1_C$; associates completion lane $L2_C$ to completion work queue $W2_C$; and associates completion lane $L3_C$ to completion work queue $W3_C$.

Persons skilled in the art will appreciate that consistent with the teachings herein, a physical adapter may be provided that implements more than or fewer than four work queues shown in the illustrative embodiment herein. The number of work queues supported for use with logical lanes by an IO storage adapter can determine the number of logical lanes that can be associated with each of the PCPU sets and with each of the cache nodes. For example considering the host machine 205 herein, which has two PCPU sets corresponding to two cache nodes, if the IO storage adapter was to support only two work queues, then a data structures likely would associate only one logical lane and only one work queue with each of the two PCPU sets. If on the other hand, the IO storage adapter was to support six work queues, then a data structure could associate three logical lanes and three work queues with each of the two PCPU sets.

FIG. 7 is an illustrative block diagram showing certain details of the IO storage adapter 202 including work queues, DMA support and Message Signaled Interrupt-Extended (MSIX) support implemented using adapter processing resources 211. The adapter 202 supports association of each of respective completion work queue $W0_C$-$W3_C$ with a respective MSIX vector MSIX0-MSIX3. The respective MSIX vectors allow an IO interrupt associated with a respective work queue to be targeted selectively to any of the multiple PCPUs. Persons skilled in the art will understand that operation of a MSIX involves a device or software component initiating an interrupt by writing information (e.g., an interrupt vector value) to a memory location that is indicative of which PCPU to invoke in response to the interrupt. One advantage of MSIX is that the data can be reprogrammed dynamically to change the PCPU invoked by an MSIX associated with a given work queue.

Each respective work queue W0-W3 is associated with its own respective DMA support DMA0-DMA3. In accordance with the SCSI protocol, an exchange of a CDB IO request and a corresponding IO completion results in transfer of data between the adapter 202 and storage 206. The virtualization intermediary 210 is involved in the exchange of CDBs and completion messages. However, DMA is used to support direct transfer of actual data between host machine memory 207 and the adapter 202 without intervention of the virtualization intermediary 210.

FIG. 8 is an illustrative drawing representing a fourth data structure 800 created within the adapter 202 that associates MSIX0-MSIX3 with respective vectors. Each of PCPU0-PCPU7 is associated with a different MSIX vector. The vectors assigned to MSIX0-MSIX3 determine which PCPUs are invoked when these interrupts are triggered. The virtualization intermediary 210 assigns the MSIX values in the fourth data structure 800 dynamically based upon a measure of the relative activity of the multiple PCPUs.

As a part of its normal operation, the virtualization intermediary 210 keeps track of the overall activity levels of each of PCPU0-PCPU7 and stores an activity score for each PCPU in host memory 207. The activity scores, which are sometimes referred to as conflict scores, are routinely updated by the virtualization intermediary 210. These activity scores typically are used to decide which PCPU to assign to a given software process so as to balance the distribution of processing load across these physical processor resources. More specifically, the virtualization intermediary 210 runs an activity scoring process encoded in host memory 207 that keeps track of how busy each of the multiple host machine PCPUs is relative to the other PCPUs. It will be appreciated that a PCPU may be busy processing multiple interrupts at any given time, and that interrupts typically are serviced on a first come first serve basis. Thus, the more interrupts that are queued to be serviced by a given PCPU, i.e., the busier that given PCPU is servicing interrupts, the longer the delay is likely to be before a new interrupt will be serviced by that PCPU. Moreover, different kinds of interrupts may impose different processing loads, i.e. consume different numbers of processor cycles. For example, an interrupt involving a system call or a dispatch of an IO request typically requires fewer processing cycles than an interrupt involving processing of an IO completion path.

Thus, for example, a given PCPU may be busy processing multiple tasks at any given time. For virtualization intermediary 210, the tasks may include, running the VMs, processing the I/O (storage, networking, mouse, keyboard, etc) generated by multiple VMs or running tasks that control and manage the VMs. The switching between the tasks by a given PCPU is controlled by interrupts, which notify the PCPU of occurrences of specific events. An interrupt handler (not shown) may register an event and queue tasks affected by the event to be executed by either a local PCPU, i.e. the PCPU which is notified of the event—or by a remote PCPU, i.e. any other PCPU. An interrupt handler (not shown) for a storage I/O completion event causes the I/O completion task to be executed on the PCPU which is notified of the completion event. Thus, delivery of the storage I/O interrupt may cause the PCPU to pre-empt some other task it was executing, and to process the completed storage I/Os. Therefore, it is advantageous to attempt and have storage I/O completion interrupts to be delivered to the least busy PCPU thus causing lesser conflicts with the other tasks in the system.

The virtualization intermediary 210 periodically, perhaps every 50 milliseconds, determines whether to re-assign vector values for MSIX0-MSIX3 so as to target the PCPUs measured as currently being least busy according to a comparison of their respective conflict scores. Accordingly, perhaps every 50 milliseconds for example, the virtualization intermediary 210 runs an interrupt vector re-assignment process that accesses activity scores stored in host memory 207 to determine the relative activity levels of PCPU0-PCPU7. The process assigns vectors to MSIX0 and MSIX1 that target the two least busy PCPUs from the first set. The process assigns vectors to MSIX2 and MSIX3 that target the two least busy PCPUs from the second set. Assignment of MSIX vectors that target the least busy PCPUs results in more efficient usage of host machine PCPU resources, which can result in faster IO processing.

Figure 9:
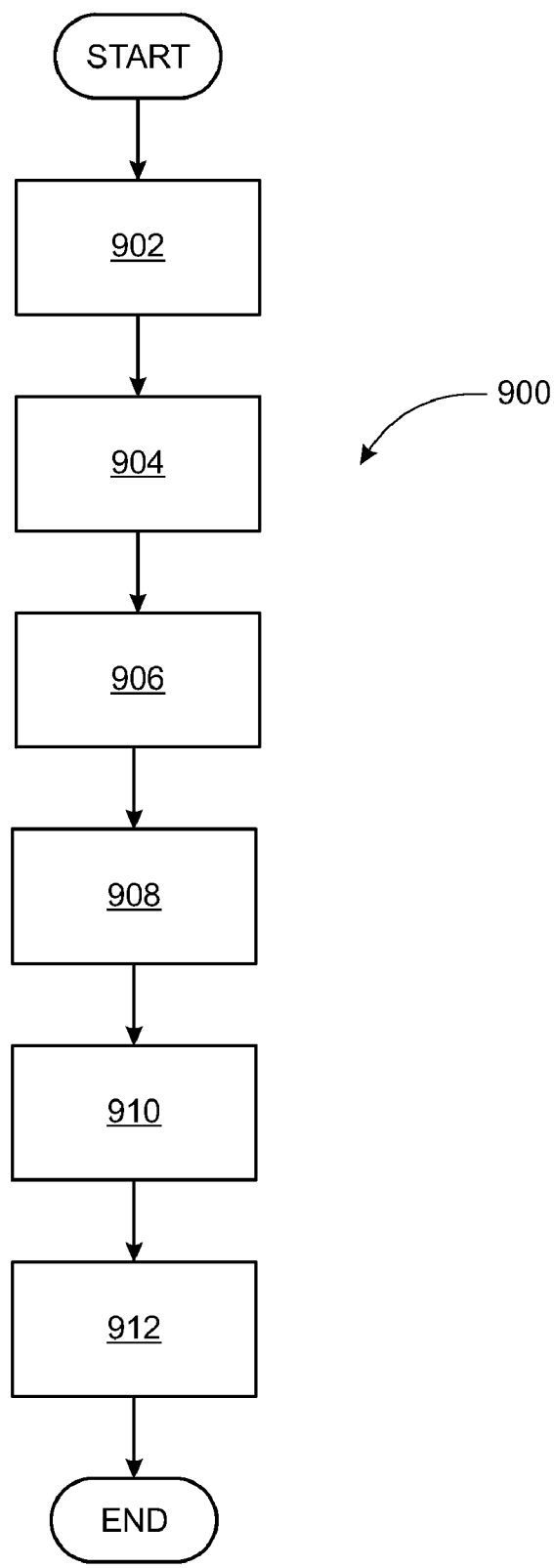
FIG. 9 is an illustrative flow diagram representing an IO request dispatch process.

FIG. 9 is an illustrative flow diagram representing an IO request dispatch process 900. The virtualization intermediary 210 allocates and configures one or more PCPUs from the core 203 according to machine readable program code stored in machine readable storage device media 207, for example, to perform the dispatch process 900. The process 900 is performed by the virtualization intermediary 210. The flow diagram of FIG. 9 includes a plurality of modules 902-912. In particular, the modules represent the virtualization intermediary 210 configuring one or more physical processors of the host machine 205, according to machine readable program code stored in machine readable storage device 207 of the host machine 205, to perform specified functions of the modules.

Multiple virtual machines (only one shown) may run simultaneously on the host machine 205, and any one or more of these VMs may contemporaneously seek to access storage 206. The process 900 is run each time that one of the multiple virtual machines issues an IO access request. The request may involve a request to Read from or to Write to storage 206. For example, the virtual machine 204 may employ a PCPU from the multi-processor core 203 to issue an IO request to logical device emulation 208. The virtualization intermediary 210 traps the request, determines that the trapped command is an IO storage access request, and invokes the storage access control process 900.

Module 902 involves the virtualization intermediary 210 referencing the first data structure 400 to identify the PCPU set membership of the PCPU employed by the VM 204 to issue the trapped IO request. Module 904 involves the virtualization intermediary 210 referencing the second data structure 500 to determine logical lanes associated with the PCPU set determined to include the PCPU employed by the VM 204 to make the IO request. Module 906 involves the virtualization intermediary 210 referencing the third data structure to determine the respective work queues associated with the identified logical lanes associated with the identified set. Module 908 involves the virtualization intermediary 210 referencing the fourth data structure 800 to identify the interrupt vector values associated with the identified work queues. Module 910 involves the virtualization intermediary 210 accessing host memory 207 to determine which if any, among the PCPUs corresponding to the identified vector values currently has the lowest activity score. Module 912 involves the virtualization intermediary 210 dispatching the trapped IO access request onto the request lane that is associated with the request work queue that is associated with the MSIX vector value corresponding to the PCPU identified as having the lowest current activity score.

The dispatched IO access request comprises a SCSI CDB that includes a field that identifies the work queue on which the request is dispatched. In some embodiments, the CDB has a structure that includes the following information.

TABLE 1

(Physical IO Dispatch Command Block)

SCSI (R/W) Command
SCSI Initiator ID
SCSI Target ID
SCSI Logical Unit ID
Host Memory Addresses for Read/Write data exchange with Storage
Work Queue ID The IO storage adapter 202 sends the IO request to physical storage 206 over SAN, for example.

In response to the dispatched CDB IO request, the storage 206 sends a reply that includes a completion message directed to the work queue identified in the CDB. In response to the arrival of the completion message in the completion work queue, the MSIX associated with that queue sends an interrupt service request to the PCPU corresponding to the vector value currently associated with that MSIX. The targeted PCPU processes the IO completion in response to the MSIX interrupt.

Thus, it will be appreciated that the dispatch process 900 utilizes cache affinity between the request issuing PCPU and the PCPU targeted for completion processing so as to avoid unnecessary accesses to host memory 207 and selects the least loaded PCPU of an identified PCPU set for completion processing in order to better balance processing loading across the multiple PCPUs. Modules 902-906 cause the dispatching of the request on one of the logical lanes associated with a PCPU from the same PCPU set as the PCPU that issued the IO request, thus ensuring cache affinity between the IO issuing PCPU and the PCPU targeted for completion processing. Modules 908-912 cause the dispatching of the request on the logical lane associated with the least active PCPU associated with the identified PCPU set, thus ensuring targeting of a PCPU to handle completion processing that is more likely to contribute to balancing of processing loading among the multiple PCPUs.

Furthermore, in the course of the processing of a given IO request and its corresponding IO completion, the virtualization intermediary 210 tracks processing activity levels of the PCPUs and increments an activity score stored in host memory 207 for the PCPU targeted to handle the completion processing. In other words, the MSIX service request targeting the PCPU to handle completion processing results in an incrementing of the activity score associated with that targeted PCPU. Thus, updates to activity scores used by modules 908-912 may occur in a time interval between MSIX re-assignment pursuant to the process 1000 of FIG. 10 described below.

Figure 10:
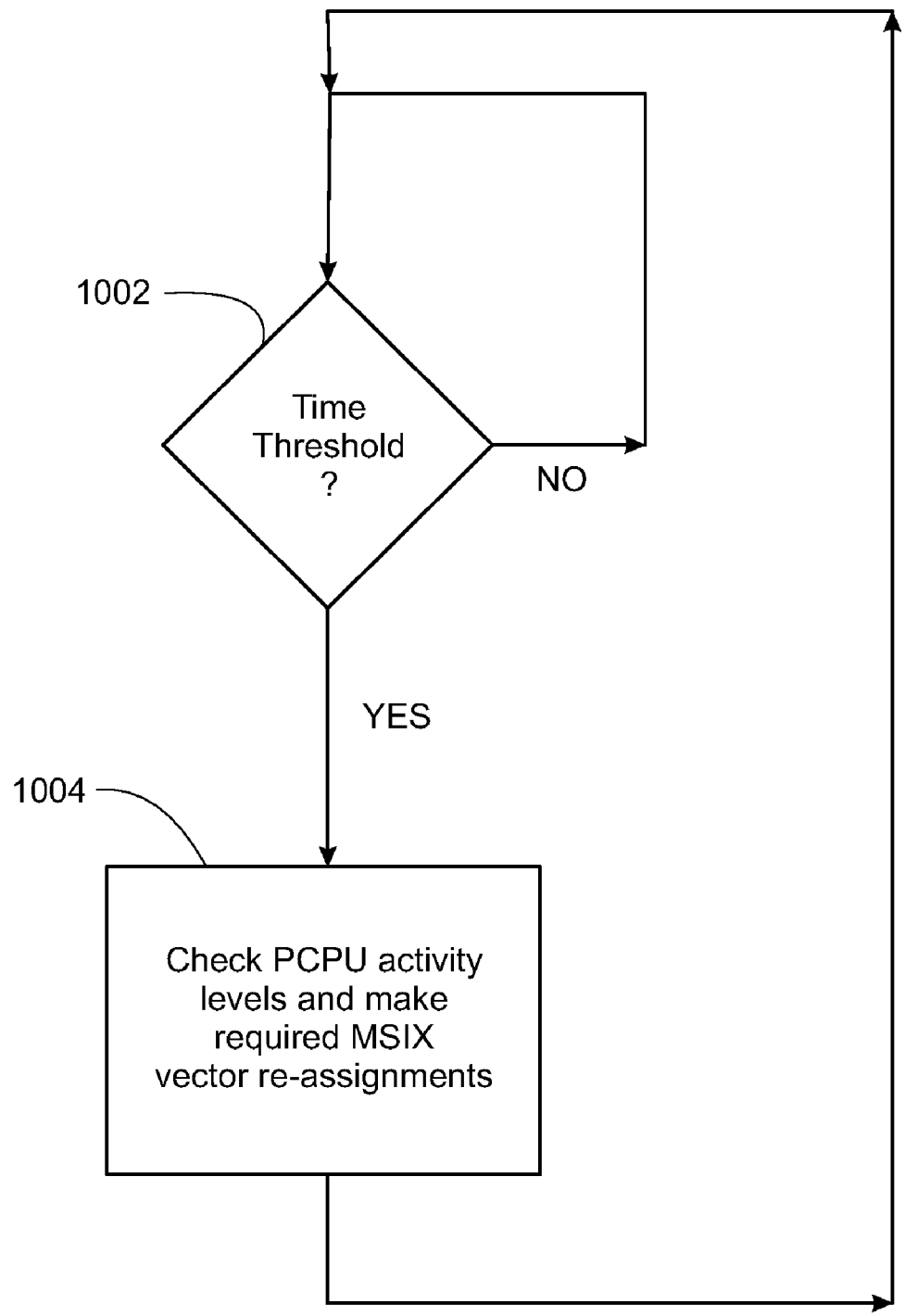
FIG. 10 is an illustrative drawing of an MSIX vector update process.

FIG. 10 is an illustrative drawing of an MSIX vector update process 1000 that runs in the course of the servicing of the IO request and its completion. The modules of FIG. 10 represent the virtualization intermediary 210 configuring one or more physical processors of the host machine 205, according to machine readable program code. More particularly, the virtualization intermediary 210 allocates and configures one or more PCPUs from the core 203 according to machine readable program code stored in machine readable storage device media 207, for example, to perform the MSIX update process 1000. The flow diagram of FIG. 10 includes a multiple modules, each representing an aspect of the process 1000 that configures the one or more PCPUs to perform a specified function of such module.

Decision module 1002 involves the virtualization intermediary 210 monitoring whether a timing threshold, perhaps some number of clock cycles, has been met for making a determination of whether or not to re-assign MSIX vectors. If the decision process 1002 determines that the timing threshold has not been met, then the process loops back and monitoring continues. If the decision module 1002 determines that the timing threshold has been met then module 1004 is invoked. Module 1004 involves the virtualization intermediary 210 accessing host memory 207 and selecting at least one of the interrupt objects (i.e. MSIX vectors) to be re-assigned to a PCPU that currently has the lowest activity score. For example, assuming that MSIX0 is to be re-assigned, module 1004 determines which of the PCPUs associated with completion work queue $W0_C$ currently is least loaded and assigns a vector corresponding to that least loaded PCPU from the set to MSIX0. In this example, the first set of PCPUs is associated with MSIX0 and MSIX1, and the second set of PCPUs are associated with MSIX2 and MSIX3.

The foregoing description and drawings of embodiments in accordance with the present invention are merely illustrative of the principles of the invention. For example, a host machine may be provided consistent with the teachings herein that includes more than or fewer than the eight PCPUs and more than or fewer than the two shared cache nodes shown in the illustrative embodiment herein. Moreover, persons skilled in the art will appreciate that other information structures can be used to inform the virtualization intermediary of relationships among PCPUs and cache nodes and to associate interrupt vectors with the least busy PCPU of a given PCPU set. Therefore, it will be understood that various modifications can be made to the embodiments by those skilled in the art without departing from the spirit and scope of the invention, which is defined in the appended claims.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. In one embodiment, the apparatus can be specially constructed for the required purpose (e.g. a special purpose machine), or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The embodiments of the present invention can also be defined as a machine that transforms data from one state to another state. The transformed data can be saved to storage and then manipulated by a processor. The processor thus transforms the data from one thing to another. Still further, the methods can be processed by one or more machines or processors that can be connected over a network. The machines can also be virtualized to provide physical access to storage and processing power to one or more users, servers, or clients. Thus, the virtualized system should be considered a machine that can operate as one or more general purpose machines or be configured as a special purpose machine. Each machine, or virtual representation of a machine, can transform data from one state or thing to another, and can also process data, save data to storage, display the result, or communicate the result to another machine.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. For use in a system that includes a host machine that includes multiple physical CPUs (PCPUs) and at least two cache nodes that are shared by different sets of the PCPUs, a method to allocate processing of IO requests among the PCPUs comprising:
creating in a memory device multiple sets of lanes each lane set associated with a respective PCPU set;
tracking levels of processing activity of the PCPUs of each PCPU set;
associating each different lane from each different set with a different PCPU from the PCPU set associated with such lane;
for each respective PCPU set, periodically identifying a respective PCPU from that PCPU set that currently has a lower level of processing activity than another PCPU from that same PCPU set that currently is associated with a given lane associated with respective PCPU set;
in response to such periodic identification, changing the association in the memory device for the given lane from the another PCPU to the identified PCPU;
receiving an IO request from any given PCPU from among the multiple PCPUs;
assigning the IO request to a respective lane that is associated with the PCPU set that includes the given PCPU and that currently is associated with a PCPU from that PCPU set that has the lowest level of processing activity of PCPUs from that PCPU set that are currently associated with lanes.

2. The method of claim 1 further including:
in the course of assigning the IO request to the respective lane, determining which PCPU that currently is associated with a lane currently has the lowest level of processing activity from among the PCPU set that includes the given PCPU.

3. The method of claim 1,
wherein creating in the memory device a respective lane for each respective PCPU set includes creating such lanes within memory space of a virtualization intermediary running on the host machine.

4. The method of claim 1 further including:
creating an association within memory space of a virtualization intermediary running on the host machine among respective PCPUs that share respective cache nodes to define a respective set of PCPUs for each respective cache node.

5. For use in a system that includes a host machine that includes multiple physical CPUs (PCPUs) and at least two cache nodes that are shared by different sets of the PCPUs and that includes an IO storage adapter, a method to allocate processing of IO requests among the PCPUs comprising:
creating in a memory device multiple sets of lanes each lane set associated with a respective PCPU set;
tracking levels of processing activity of the PCPUs of each PCPU set;
associating each different lane from each different set with a different PCPU from the PCPU set associated with such lane;
for each respective PCPU set, periodically identifying a respective PCPU from that PCPU set that currently has a lower level of processing activity than another PCPU from that same PCPU set that currently is associated with a given lane associated with respective PCPU set;
in response to such periodic identification, changing the association in the memory device for the given lane from the another PCPU to the identified PCPU;
receiving a IO request from any given PCPU from among the multiple PCPUs;
assigning the IO request to a respective lane that is associated with the PCPU set that includes the given PCPU and that currently is associated with a PCPU from that PCPU set that has the lowest level of processing activity of PCPUs from that PCPU set that are currently associated with lanes;
providing in the IO storage adapter multiple respective work queues, each associated with a respective Message Signaled Interrupt-Extended (MSIX) vector;
creating an association in a memory device among respective lanes and respective work queues;
wherein associating a respective lane with a respective PCPU includes associating a respective MSIX vector associated with a respective work queue that is associated with the respective lane, with a respective MSIX vector value that identifies the respective PCPU.

6. The method of claim 5,
wherein creating an association in a memory device among respective lanes and respective work queues includes creating such association within memory space of a virtualization intermediary running on the host machine.

7. The method of claim 5,
wherein each respective work queue includes a respective request work queue and a respective reply work queue; and
wherein respective MSIX vectors are associated with respective completion work queues.

8. The method of claim 7,
wherein respective lanes include respective request lanes and respective completion lanes; and
wherein creating an association in a memory device among respective lanes and respective work queues includes creating respective associations between respective request lanes and respective request work queues and creating associations between respective completion lanes and respective completion work queues.

9. The method of claim 5 further including:
in the course of assigning the IO request to the respective lane, determining which PCPU that currently is associated with a lane currently has the lowest level of processing activity from among the PCPU set that includes the given PCPU.

10. The method of claim 9 further including:
transferring the IO request from the assigned request lane to an associated request work queue;
sending the IO request from the associated request work queue to physical storage, the sent IO request including an identifier of a respective completion work queue;
receiving by the identified completion work queue, a completion message from physical storage;
in response to receiving the completion message, triggering a respective MSIX vector associated with the receiving completion work queue that has an associated vector value that identifies the PCPU that currently is associated with the assigned lane;

transferring the received completion message from the receiving completion work queue to an associated completion lane; and processing of the completion using the PCPU identified by the MSIX vector value.

11. The method of claim 5,
wherein creating in the memory device a respective lane for each respective PCPU set includes creating such lanes within memory space of a virtualization intermediary running on the host machine.

12. The method of claim 5 further including:
creating an association within memory space of a virtualization intermediary running on the host machine among respective PCPUs that share respective cache nodes to define a respective set of PCPUs for each respective cache node.

13. The method of claim 1 further including:
using a computer system in the step of assigning the IO request to a respective lane.

14. The method of claim 5 further including:
using a computer system in the step of assigning the IO request to a respective lane.

15. For use in a system that includes a host machine that includes multiple physical CPUs (PCPUs) and at least two cache nodes that are shared by different sets of the PCPUs a virtualized apparatus to allocate processing of IO requests among the PCPUs comprising:

multiple sets of lanes disposed in memory space of a virtualization intermediary, each lane set associated with a respective PCPU set;

means for tracking levels of processing activity of the PCPUs of each PCPU set;

an information structure disposed in memory space of the virtualization intermediary associating each different lane from each different set with a different PCPU from the PCPU set associated with such lane;

means for periodically, for each respective PCPU set, identifying a respective PCPU from that PCPU set that currently has a lower level of processing activity than another PCPU from that same PCPU set that currently is associated with a given lane associated with respective PCPU set;

means for, in response to such periodic identification, changing the association in the memory device for the given lane from the another PCPU to the identified PCPU; and means for assigning an IO request from any given PCPU from among the multiple PCPUs to a respective lane that is associated with the PCPU set that includes the given PCPU and that currently is associated with a PCPU from that PCPU set that has the lowest level of processing activity of PCPUs from that PCPU set that are currently associated with lanes.

16. For use in a system that includes a host machine that includes multiple physical CPUs (PCPUs) and at least two cache nodes that are shared by different sets of the PCPUs and that includes an IO storage adapter, a virtualized apparatus to allocate processing of IO requests among the PCPUs comprising:

multiple sets of lanes disposed in memory space of a virtualization intermediary, each lane set associated with a respective PCPU set;

means for tracking levels of processing activity of the PCPUs of each PCPU set;

an information structure disposed in memory space of the virtualization intermediary associating each different lane from each different set with a different PCPU from the PCPU set associated with such lane;

means for periodically, for each respective PCPU set, identifying a respective PCPU from that PCPU set that currently has a lower level of processing activity than another PCPU from that same PCPU set that currently is associated with a given lane associated with respective PCPU set;

means for, in response to such periodic identification, changing the association in the memory device for the given lane from the another PCPU to the identified PCPU; and means for assigning an IO request from any given PCPU from among the multiple PCPUs to a respective lane that is associated with the PCPU set that includes the given PCPU and that currently is associated with a PCPU from that PCPU set that has the lowest level of processing activity of PCPUs from that PCPU set that are currently associated with lanes;

multiple respective work queues disposed within the IO storage adapter, each associated with a respective Message Signaled Interrupt-Extended (MSIX) vector;

an information structure disposed in memory space of the virtualization intermediary associating respective lanes with respective work queues;

an information structure disposed in the IO storage adapter that associates respective MSIX vectors with respective work queues;

wherein the means for associating a respective lane with a respective PCPU includes a respective MSIX vector associated with a respective work queue that is associated with the respective lane, that is associated with a respective MSIX vector value that identifies the respective PCPU.

* * * * *